US010935372B2

(12) United States Patent
Omlor et al.

(10) Patent No.: US 10,935,372 B2
(45) Date of Patent: Mar. 2, 2021

(54) DEVICE AND METHOD FOR MEASURING A SURFACE TOPOGRAPHY, AND CALIBRATION METHOD

(71) Applicant: Carl Zeiss AG, Oberkochen (DE)

(72) Inventors: Lars Omlor, Pleasanton, CA (US); Carsten Glasenapp, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 16/154,670

(22) Filed: Oct. 8, 2018

(65) Prior Publication Data
US 2019/0049238 A1 Feb. 14, 2019

Related U.S. Application Data

(63) Continuation-in-part of application No. PCT/EP2017/058412, filed on Apr. 7, 2017.

(30) Foreign Application Priority Data

Apr. 8, 2016 (DE) ...................... 10 2016 106 535.8

(51) Int. Cl.
G01B 11/25 (2006.01)
G01M 11/02 (2006.01)
G03B 3/04 (2006.01)

(52) U.S. Cl.
CPC ...... *G01B 11/2504* (2013.01); *G01B 11/2513* (2013.01); *G01M 11/025* (2013.01); *G03B 3/04* (2013.01)

(58) Field of Classification Search
CPC ....... G06T 7/514; G06T 7/521; G06T 7/0002; G06T 7/0004; G06T 2207/30108;
(Continued)

(56) References Cited

U.S. PATENT DOCUMENTS 4,998,819 A    3/1991  Labinger et al.
7,019,826 B2*  3/2006  Vook ..................... G06T 7/0002
                                                          250/559.34
(Continued)

FOREIGN PATENT DOCUMENTS

DE    102011010252 A1    8/2012
DE    102013208091 A1    11/2014
(Continued)

OTHER PUBLICATIONS

Miyazaki et al., "Shape Estimation of Transparent Objects by Using Inverse Polarization Ray Tracing", Nov. 2007, IEEE, Transactions on Pattern Analysis and Machine Intelligence, vol. 29, No. 11, p. 2018-2029 (Year: 2007).*
(Continued)

*Primary Examiner* — Vincent Rudolph
*Assistant Examiner* — Timothy Choi
(74) *Attorney, Agent, or Firm* — Thrive IP®; Georg M. Hasselmann

(57) ABSTRACT

A method and a device for measuring the topography and/or the gradients and/or the curvature of an optically active surface of an object are disclosed. The device allows the object to be arranged in a receiving region with a contact surface for contact with the object. Inside the device, there is a plurality of point light sources that provide light that is reflected at the surface to be measured of an object arranged in the receiving region. The device includes at least one camera with an objective assembly and an image sensor for detecting a brightness distribution which is produced on a light sensor by the light of the point light sources reflected at the surface to be measured.

15 Claims, 6 Drawing Sheets

(58) Field of Classification Search
CPC ..... G01B 11/254; G01B 11/303; G01B 11/24; G01B 11/25; G01B 11/2513; G01B 11/30; G01M 11/025; G01M 11/0257; G01M 11/0242
See application file for complete search history.

(56) References Cited

U.S. PATENT DOCUMENTS

| | | | |
|---|---|---|---|
| 8,040,426 | B2 | 10/2011 | Zhou |
| 9,797,804 | B2 | 10/2017 | Glasenapp et al. |
| 2005/0068523 | A1 | 3/2005 | Wang et al. |
| 2006/0017720 | A1 | 1/2006 | Li |
| 2008/0304081 | A1* | 12/2008 | Debevec ............... G01B 11/25 356/612 |
| 2010/0079598 | A1 | 4/2010 | Ke et al. |
| 2011/0144505 | A1* | 6/2011 | Yamamoto ........... A61B 5/0064 600/476 |
| 2011/0311107 | A1* | 12/2011 | Levesque ............... G01B 11/24 382/106 |
| 2016/0054196 | A1* | 2/2016 | Glasenapp ......... G01M 11/0207 356/124 |

FOREIGN PATENT DOCUMENTS

| | | | |
|---|---|---|---|
| DE | 102013219838 | A1 | 4/2015 |
| EP | 1884828 | A1 | 2/2008 |
| EP | 2101143 | A1 | 9/2009 |
| WO | WO2014177632 | * | 11/2014 ........ G01M 11/0242 |

OTHER PUBLICATIONS

Morse et al., "Interpolating implicit surfaces from scattered surface data using compactly supported radial basis functions", May 2001, IEEE, Proceedings Int. Conf. on Shape Modeling and Applications, p. 78-87. (Year: 2001).*

Griffiths et al., "Analysis of cornea curvature using radial basis functions—Part I: Methodology", Oct. 2016, Elsevier, Computers in Biology and Medicine, vol. 77, p. 274-284. (Year: 2016).*

Alinoori et al., "Topography measurement of freeform specular surfaces using experimental ray tracing and radial basis functions", Oct. 2016, SPIE, Reflection, Scattering, and Diffraction from Surfaces V, Proc. of SPIE vol. 9961, p. 99610S-1-99610S-6 (Year: 2016).*

Cuomo et al., "Surface Reconstruction from Scattered Point via RBF Interpolation on GPU", Sep. 2013, IEEE, 2013 Federated Conference on Computer Science and Information Systems, p. 433-440. (Year: 2013).*

Gordon, "A Method for Locating Specular Points", Apr. 2014, IEEE, Transactions on Antennas and Propagation, vol. 62, No. 4, p. 2269-2271. (Year: 2014).*

Horn, "Obtaining Shape From Shading Information", Aug. 1989, MIT Press, Shape from Shading, p. 115-156. (Year: 1989).*

"IEEE Transactions on Antennas and Propagation: Aims and Scope", Oct. 20, 2013, IEEE, <https://web.archive.org/web/20131020193933/http://ieeexplore.ieee.org/xpl/aboutJournal.jsp?punumber=8>. (Year: 2013).*

International Preliminary Report on Patentability and English-language translation thereof, issued in PCT/EP2017/058412, to which this application claims priority, dated Oct. 11, 2018.

Galliani et al. "Fast and Robust Surface Normal Integration by a Discrete Eikonal Equation," in Proceedings of British Machine Vision Conference, pp. 1-11 (2012).

International Search Report and English-language translation thereof, issued in PCT/EP2017/058412, to which this application claims priority, dated Sep. 4, 2017.

Written opinion of PCT/EP2017/058412, to which this application claims priority, dated Oct. 12, 2017.

Office action issued by the German Patent and Trademark Office (DPMA) in DE 10 2016 106 535.8 to which this application claims priority, dated Jan. 19, 2017.

* cited by examiner

DEVICE AND METHOD FOR MEASURING A SURFACE TOPOGRAPHY, AND CALIBRATION METHOD

CROSS REFERENCE TO RELATED APPLICATIONS

This application is a continuation-in-part application of international application PCT/EP2017/058412, filed Apr. 7, 2017, and designating the United States, which claims priority to German patent application DE 10 2016 106 535.8, filed Apr. 8, 2016, both of which are hereby incorporated by reference in their entireties.

TECHNICAL FIELD

The disclosure relates to methods and apparatuses for measuring the topography and/or the gradients and/or the curvature of an optically effective surface of an article, in particular a spectacle lens. Moreover, the disclosure relates to a method for calibrating an apparatus for measuring the topography and/or the gradients and/or the curvature of an optically effective surface of an article.

BACKGROUND

U.S. Pat. No. 4,998,819 discloses an apparatus for measuring the topography of an article, in which reflections are produced at the surface of the article by means of a multiplicity of light-emitting diodes arranged on the inner side of a spherical surface portion, the reflections being captured by a photodetector and then being evaluated.

An apparatus for measuring the topography and/or the gradients and/or the curvature of an optically effective surface of an article embodied as a spectacle lens is described in U.S. Pat. No. 9,797,804 B2, for example.

SUMMARY

It is an object of the disclosure to provide an apparatus and a method for precise local measurement of the topography and/or the gradients and/or the curvature of an optically effective surface of an article with a relatively small error, e.g., a relative error that only lies in the percentage range or less.

In particular, it is an object of the disclosure to specify an apparatus and a method for measuring the local curvature profiles of optically effective surfaces with an absolute accuracy of at least $10^{-2}$ dpt.

This object is achieved by the methods and apparatuses for measuring the topography and/or the gradients and/or the curvature of an optically effective surface of an article, in particular a spectacle lens, and the method, specified in the independent claim, for calibrating an apparatus for measuring the topography and/or the gradient and/or the curvature of an optically effective surface of an article.

A point light source within the meaning of the disclosure is a light source whose extent is so small that it appears substantially as a point source when viewed from a point lying within the recording region; i.e., which, in relation to a point lying in the recording region, only covers a solid angle $\Omega_P$ of size $\Omega_P \leq 0.5\%$ sr or $\Omega_P \leq 0.3\%$ sr or $\Omega_P \leq 0.1\%$ sr or typically of size $\Omega_P \leq 0.05\%$ sr, for example. Such a point light source can be embodied as a light-emitting diode (LED), for example, as a so-called surface-mount device (SMD) light-emitting diode.

However, a point light source within the meaning of the disclosure can also be embodied as an end of a light guide arranged in the polyhedral surface. However, a point light source within the meaning of the disclosure can also be an aperture in a perforated mask, the apertures being assigned to one or more background illuminations. A point light source within the meaning of the disclosure serves to illuminate the optically effective surface of the article to be measured by means of a light point.

The disclosure is based on the idea that capturing information about the position of a multiplicity of points of the surface of an article allows very precise establishment of both the curvature and the topography of the surface of the article by virtue of the captured position being processed using algorithms in a computer unit by way of a computer program. Here, the concept of the disclosure lies in processing the captured information by way of iterative algorithms and hence substantially increasing the measurement accuracy for measuring the article. Moreover, it is an aspect of the disclosure to transfer the computation with iterative algorithms to central powerful computers located anywhere in the world (remote computing) to be able to carry out the measurement of the topography and/or the gradients and/or the curvature of an optically effective surface of an article within a short period of time, i.e., within seconds. Within the scope of the disclosure, external ray tracing programs, such as, CODE V® by Synopsys Inc., 690 East Middlefield Road, Mountain View, Calif. 94043 USA or ZEMAX® by Zemax LLC, 10230 NE Points Dr. Suite 540, Kirkland, Wash. (State) 98033, USA, can be incorporated into corresponding algorithms. This measure facilitates, in particular, a reduction of required computational times. It is also an aspect of the disclosure to be able to transfer iterative algorithms for processing the captured information relating to a multiplicity of points on the surface of an article to graphics processing units (GPUs) as well. Reduced computation times are likewise a consequence of this measure.

What can be achieved by virtue of the image sensor of the camera being arranged in a linearly movable displaceable fashion along an adjustment axis that passes through the lens assembly is that the apparatus can be calibrated very accurately by measuring test objects.

Using this, in particular, the disclosure facilitates a measurement of the refractive power of an asphere with an accuracy of at least $10^{-2}$ dpt. Moreover, the disclosure facilitates a measurement of the topography of concave and convex free-form surfaces. In particular, the disclosure facilitates a measurement of aspherical lens elements with mean radii between −50 mm . . . −1000 mm and +50 mm . . . +1000 mm in the case of an object size of up to 80 mm in diameter, and a measurement of the local and overall refractive power and topography. The inventors could show that the disclosure renders it possible to measure free-form surfaces within a time interval that does not exceed 10 s if use is made of the aforementioned remote computing.

The point light sources in an apparatus for measuring the topography and/or the gradient and/or the curvature of an optically effective surface of an article of the disclosure are typically arranged on a two-dimensional hypersurface delimiting a three-dimensional half-space.

The two-dimensional hypersurface delimiting the three-dimensional half-space can be a lateral surface of a polyhedron, for example. Here, a polyhedron is understood to mean a subset of the three-dimensional space which is only delimited by straight surfaces, i.e., planes. By way of example, the polyhedron can be a truncated icosahedron, a cube, a dodecahedron, an icosahedron, a heptagonal frustum with a cylinder construction, a hexagonal frustum with a cylindrical intermediate structure or a nonagonal cone with a second frustum with a different gradient. Here, the point light sources are typically embodied, at least in part, as light-emitting diodes. It is also a concept of the disclosure to provide a support structure with a printed circuit board or a plurality of printed circuit boards for the point light sources.

A printed circuit board, also referred to as circuit board, is understood in the present case to mean a printed circuit board assembly, embodied as a flat carrier, for receiving electric and/or electronic components. On such a printed circuit board assembly, these components can be wired as desired or, in a preferred embodiment, can be connected to conducting connections adhering to the electrically insulating material. The flat carrier of the printed circuit board assembly can be produced from FR2, FR3, CEM1, CEM3 or FR4 material, for example.

Light-emitting diodes in the form of SMDs can be assembled on printed circuit boards in pick-and-place machines. Here, pick-and-place machines facilitate defined positioning of light-emitting diodes on a printed circuit board with a positional accuracy, which lies in the range from 0.001 mm to 0.01 mm and, for example, which can be exactly predetermined with a CAD program.

Advantageously, the lens assembly has an optical axis that lies flush with the adjustment axis. Here, the optical axis of the lens assembly is understood to mean the connecting line of the centers of curvature of the surfaces of the optical elements of the lens assembly that refract the light. As a rule, the optical axis is the axis of symmetry of the optical elements of an optical assembly.

An apparatus according to the disclosure can have a lens element, typically a field lens element, arranged between the recording region and the lens assembly, the refractive power of the lens element being positive or negative. In the present case, a field lens element is understood to mean a positive field lens which causes the angle of incidence, related to the surface normal, of the light emitted by the point light sources to become steeper on the optically effective surface of the article to be measured. What this can achieve is that the topography of optically effective concave surfaces of an article to be measured can also be determined with high accuracy.

It is advantageous if the lens element, typically the field lens element, also has an optical axis that is flush with the optical axes of the lens assembly, i.e., has an axis of symmetry that coincides with the optical axis of the lens assembly. This renders it possible to measure concave optically effective surfaces of articles with a high accuracy.

In order to calibrate an apparatus according to the disclosure for measuring the topography and/or the gradients and/or the curvature of an optically effective surface of an article, the position of the spherical abutment is determined in a coordinate system that is referenced to the image sensor of the camera, and the imaging scale and the distortion of the optical imaging system of the camera are also determined. Here, it is particularly advantageous if the position of the abutment is established by measuring test objects with a known geometry using an optimization method. The imaging scale can be determined by measuring the brightness distribution of the disk-shaped test object on the image sensor.

It is also advantageous if the extent of the adjustment axis of the image sensor is determined in a coordinate system that is referenced to the image sensor. In particular, it is advantageous if the position of the point light sources is determined in a coordinate system that is referenced to the image sensor of the camera by way of an optimization method, i.e., with a method in which a target function is maximized or minimized.

By way of example, an optimization method that minimizes a target function by means of which the deviation between an object reconstruction and a known geometry of the test object is determined can be used as an optimization method in this case, with determining of the maximum or minimum of the target function being established by varying system parameters. The system parameters can be varied using a gradient descent method, for example.

In the case of an apparatus according to the disclosure with a lens element, typically a field lens element, arranged between the recording region and the lens assembly, it is expedient if, in a first step, the reflections of the point light sources at the lens element, typically at the field lens element, are determined and these reflections are then suppressed in the brightness distribution captured in relation to a test object on the image sensor.

To avoid bothersome light reflections, it is advantageous if a material that absorbs light in the wavelength range of the light emitted by the point light sources is arranged between the point light sources.

The disclosure also extends to a method for measuring the topography and/or the gradients and/or the curvature of an optically effective surface of an article, which may comprise the following steps:
  i. arranging the article to be measured on an abutment resting against the article in a recording region;
  ii. capturing a brightness distribution composed of luminous spots, the brightness distribution being caused on an image sensor by the light of one or more point light sources that is reflected at the surface to be measured;
  iii. establishing the centroids of the luminous spots on the image sensor;
  iv. assigning the brightness distribution to the point light sources causing the brightness distribution;
  v. determining reflection locations on the article for the light emitted by the point light sources;
  vi. calculating the surface normals $\vec{n}$ at the reflection locations for the light emitted by the point light sources;
  vii. calculating the topography of the article by integrating the directional derivatives of the surface determined by the surface normals $\vec{n}$;
  viii. iteratively repeating steps v. to vii. up to a convergence criterion, i.e., iterative steps v. to vii. are repeated until a normal difference of the topographies calculated in two successive steps is less than a predetermined tolerance; and
  ix. establishing the relative and/or absolute position of at least one point on the surface of the article in a coordinate system that is referenced to the coordinate system of the image sensor.

The disclosure also extends to a computer program having program code for calibrating an apparatus for measuring the topography and/or the gradient and/or the curvature of an optically effective surface of an article and to a computer program having program code, in particular for executing steps iii. to ix. in the method specified above.

Moreover, the disclosure relates to a computer having a processor and a memory, in which an above-specified computer program is stored.

Exemplary embodiments of the disclosure are reproduced in clauses 1 to 38 specified below.

Clause 1: A method for measuring the topography and/or the gradients and/or the curvature of an optically effective surface (18) of an article (12), comprising the following steps:
  i. arranging the article on an abutment resting against the article (12) in a recording region (14);
  ii. capturing a brightness distribution (79) composed of luminous spots (57), the brightness distribution being caused by the light of one or more light spots, typically point light sources (20), that is reflected at the surface (18) of the article (12) to be measured;
  iii. establishing the absolute and/or relative position, typically the centroids (58), of the luminous spots (57);
  iv. assigning the brightness distribution to the light spots, typically point light sources (20), causing the brightness distribution;
  v. determining reflection locations on the article (12) for the light emitted by the light spots, typically point light sources (20);
  vi. calculating surface normals $\vec{n}$ at the reflection locations for the light emitted by the light spots, typically point light sources (20);
  vii. calculating the topography of the article (12) by integrating the surface normals $\vec{n}$;
  viii. iteratively repeating steps v. to vii. up to a convergence criterion; and
  ix. establishing the absolute and/or relative position of at least one point (50) on the surface (18) of the article (12) to be measured in a coordinate system (78) that is fixed relative to an apparatus.

Clause 2: An apparatus (10) for measuring the topography and/or the gradients and/or the curvature of an optically effective surface (18) of an article (12), comprising:
  i. a holding device (16) for arranging the article on an abutment resting against the article (12) in a recording region (14);
  ii. a device for capturing a brightness distribution (79) composed of luminous spots (57), the brightness distribution being caused by the light of one or more light spots, typically point light sources (20), that is reflected at the surface (18) of the article (12) to be measured;
  iii. a device for establishing the absolute and/or relative position, typically the centroids (58), of the luminous spots (57); and
  iv. a device for establishing the absolute and/or relative position of at least one point (50) on the surface (18) of the article (12) in a coordinate system (78) that is fixed relative to an apparatus, comprising the following steps:
  (b) Step 1:
  (c) assigning the brightness distribution to the light spots, typically point light sources (20), causing the brightness distribution;
  (d) Step 2:
  (e) determining reflection locations on the article (12) for the light emitted by the light spots, typically point light sources (20);
  (f) Step 3:
  (g) calculating the surface normals $\vec{n}$ at the reflection locations for the light emitted by the light spots, typically point light sources (20);
  (h) Step 4:
  (i) calculating the topography of the article (12) by integrating the surface normals $\vec{n}$; and
  (2) iteratively repeating steps 1 to 4 up to a convergence criterion.

Clause 3: The apparatus according to clause 2, wherein the device for capturing a brightness distribution (79) composed of luminous spots (57) comprises at least one camera (34) with a lens assembly (40) and with an image sensor (46), on which the brightness distribution of light that is reflected at the surface (18) is caused.

Clause 4: An apparatus (10) for measuring the topography and/or the gradients and/or the curvature of an optically effective surface (18) of an article (12), comprising at least one camera (34) with a lens assembly (40) and with an image sensor (46) for capturing a brightness distribution, which is caused on an image sensor (46) by light that is reflected at the surface (18); wherein the image sensor (46) of the camera (34) is arranged in a linearly movable displaceable fashion along an adjustment axis (52) that passes through the lens assembly (40).

Clause 5: The apparatus according to clause 3 or 4, wherein the lens assembly (40) has an optical axis (42) that lies flush with the adjustment axis (52).

Clause 6: The apparatus according to clause 4 or clause 5, wherein a device (16) for arranging the article (12) to be measured on an abutment resting against the article (12) in a recording region (14) is provided.

Clause 7: The apparatus according to clause 6, wherein a multiplicity of light spots, typically point light sources (20) is provided, that provide light, the light being reflected at the surface (18) of an article (12) to be measured that is arranged in the recording region.

Clause 8: The apparatus according to clause 3 or clause 7, wherein a computer unit (56) with a computer program and with a memory is provided, in which the computer program is stored, wherein the computer program calculates the topography and/or the gradients and/or the curvature of an optically effective surface (18) of the article (12) by way of algorithms from a brightness distribution captured by the image sensor (46), the brightness distribution being caused on an image sensor (46) by light of the light spots, typically point light sources (20), that is reflected at the surface (18) to be measured.

Clause 9: The apparatus according to any one of clauses 2, 3, 7 or 8, wherein the point light sources (20) are arranged on a half-space, typically on a hypersurface (26) or a hemisphere that delimits a three-dimensional half-space.

Clause 10: The apparatus according to any one of clauses 3 or 6 to 9, wherein a lens element, typically a field lens element (80), arranged between the recording region (14) and the lens assembly (40) is provided, the refractive power of the lens element being positive or negative and the lens element serving to guide the light of the light spots (20), typically of the point light sources, to the article (12) and to supply the light reflected at the article (12) to the camera (34).

Clause 11: The apparatus according to clause 10, wherein the field lens element (80) has an optical axis that lies flush with the optical axis (42) of the lens assembly (40).

Clause 12: A method for measuring the topography and/or the gradients and/or the curvature of an optically effective surface (18) of an article (12), comprising the step of providing at least one camera (34) with a lens assembly (40) and with an image sensor (46) for capturing a brightness distribution, which is caused on an image sensor (46) by the light that is reflected at the surface (18) to be measured; and the step of displacing the image sensor (46) of the camera (34) along an adjustment axis (52) that passes through the lens assembly (40).

Clause 13: An apparatus (10) for measuring the topography and/or the gradients and/or the curvature of an optically effective surface (18) of an article (12), with a device for arranging the article (12) in a recording region (14) with an abutment (17) that is able to be placed on the article (12); with a multiplicity of light spots, typically point light sources (20), that provide light, the light being reflected at the surface (18) of an article to be measured that is arranged in the recording region (14); with at least one camera (34) with a lens assembly (40) and with an image sensor (46) for capturing a brightness distribution, which is caused on an image sensor (46) by the light of the light spots, typically point light sources (20), that is reflected at the surface (18) to be measured; and with a lens element, typically a field lens element (80), arranged between the recording region (14) and the lens assembly (40), the refractive power of the lens element being positive or negative, wherein the lens element, typically field lens element (80), has an optical axis that lies flush with the optical axis (42) of the lens assembly (40), wherein the absolute and/or relative position of the light spots, typically point light sources (20), is determined with an optimization method.

Clause 14: A method for measuring the topography and/or the gradients and/or the curvature of an optically effective surface (18) of an article (12), comprising the following steps:
i) arranging the article (12) in a recording region (14) with an abutment (17) that is able to be placed on the article (12);
ii) providing light from a multiplicity of light spots, typically point light sources (20), the light being reflected at the surface (18) of the article to be measured that is arranged in the recording region (14);
iii) providing at least one camera (34) with an image sensor (46) and with a lens assembly (40);
iv) providing a lens element, typically a field lens element (80), arranged between the recording region (14) and the lens assembly (40), the refractive power of the lens element being positive or negative, wherein the lens element, typically field lens element (80), has an optical axis that lies flush with the optical axis (42) of the lens assembly (40); and
v) capturing a brightness distribution, which is caused on the image sensor (46) by the light of the light spots, typically point line sources (20), that is reflected at the surface (18) to be measured; and implementing the determination of the absolute and/or relative position of the light spots, typically point light sources (20), using an optimization method.

Clause 15: A method for calibrating an apparatus (10) for measuring the topography and/or the gradients and/or the curvature of an optically effective surface (18) of an article (12),
i) with a device for arranging the article (12) in a recording region (14) with an abutment (17) that is able to be placed on the article (12);
ii) with a multiplicity of light spots, typically point light sources (20), that provide light, the light being reflected at the surface (18) of an article to be measured that is arranged in the recording region (14);
iii) with at least one camera (34) with a lens assembly (40) and with an image sensor (46) for capturing a brightness distribution, which is caused on an image sensor (46) by the light of the light spots, typically point light sources (20), that is reflected at the surface (18) to be measured;
iv) with a lens element, typically a field lens element (80), arranged between the recording region (14) and the lens assembly (40), the refractive power of the lens element being positive or negative, and wherein the imaging scale and the distortion of the optical imaging system of the camera (34) is determined.

Clause 16: The method according to clause 15, wherein the absolute and/or relative position of the abutment (17) is determined in a coordinate system (78) that is referenced to the image sensor (46) of the camera (34).

Clause 17: The method according to clause 16, wherein the absolute and/or relative position of the abutment (17) is determined by measuring test objects with a known geometry using an optimization method.

Clause 18: The method according to clause 15 or 16, wherein the imaging scale is determined by measuring the brightness distribution (79) of a disk-shaped test object (76) on the image sensor (46).

Clause 19: The method according to any one of clauses 15 to 18, wherein the extent of an adjustment axis (52) of the image sensor (46) is determined in a coordinate system (78) that is referenced to the image sensor (46).

Clause 20: The method according to any one of clauses 15 to 19, wherein the following steps are implemented:
i) determining reflections of the light spots, typically point light sources (20), at the lens element, typically field lens element (80);
ii) suppressing these reflections in the brightness distribution (79) captured in relation to a test object on the image sensor (46).

Clause 21: A computer program having program code means for implementing a method according to any one of clauses 1, 12, 14 or 15 to 20 when the program is executed on a computer unit (56).

Clause 22: An apparatus (10) for measuring the topography and/or the gradients and/or the curvature of an optically effective surface (18) of an article (12), with a device for arranging the article (12) in a recording region (14) with an abutment (17) that is able to be placed on the article (12); with a multiplicity of light spots, typically point light sources (20), that provide light, the light being reflected at the surface (18) of an article to be measured that is arranged in the recording region (14); and with at least one camera (34) with a lens assembly (40) and with an image sensor (46) for capturing a brightness distribution, which is caused on an image sensor (46) by the light of the light spots, typically point light sources (20), that is reflected at the surface (18) to be measured; wherein the image sensor (46) of the camera (34) is arranged in a linearly movable displaceable fashion along an adjustment axis (52) that passes through the lens assembly (40).

Clause 23: The apparatus according to clause 22, wherein a computer unit (56) with a computer program and with a memory, in which the computer program is stored, wherein the computer program calculates the topography and/or the gradients and/or the curvature of an optically effective surface (18) of the article (12) by way of algorithms from a brightness distribution captured by the image sensor (46), the brightness distribution being caused on an image sensor (46) by light of the light spots, typically point light sources (20), that is reflected at the surface (18) to be measured.

Clause 24: The apparatus according to clause 22 or 23, wherein the light spots, typically point light sources (20), are arranged on a two-dimensional hypersurface (26) that delimits a three-dimensional half-space and/or wherein the lens assembly (40) has an optical axis (42) that is flush with the adjustment axis (52).

Clause 25: The apparatus according to any one of clauses 22 to 24, wherein a lens element, typically a field lens element (80), arranged between the recording region (14) and the lens assembly (40) is provided, the refractive power of the lens element being positive or negative.

Clause 26: The apparatus according to clause 25, wherein the lens element, typically the field lens element (80), has an optical axis that lies flush with the optical axis (42) of the lens assembly (40).

Clause 27: A method for calibrating an apparatus (10) for measuring the topography and/or the gradients and/or the curvature of an optically effective surface (18) of an article according to any one of clauses 22 to 26, comprising the following steps:
  determining the absolute and/or relative position of the abutment in a coordinate system (78) that is referenced to the image sensor (46) of the camera (34); and
  determining the imaging scale and the distortion of the optical imaging system of the camera (34).

Clause 28: The method according to clause 27, wherein the absolute and/or relative position of the abutment (17) is determined by measuring test objects (76) with a known geometry using an optimization method.

Clause 29: The method according to clause 27 or 28, wherein the imaging scale is determined by measuring the brightness distribution (79) of a disk-shaped test object (76) on the image sensor (46).

Clause 30: The method according to any one of clauses 27 to 29, wherein the extent of the adjustment axis (52) of the image sensor (46) is determined in a coordinate system (78) that is referenced to the image sensor (46).

Clause 31: The method according to any one of clauses 26 to 30, wherein the position of the light points, typically the point light sources (20), is determined in a coordinate system (78) that is referenced to the image sensor (46) of the camera (34) using an optimization method.

Clause 32: A method for calibrating an apparatus (10) for measuring the topography and/or the gradients and/or the curvature of an optically effective surface (18) of an article according to either of clauses 25 or 26, comprising the following steps:
  determining the absolute position of the abutment (17) in a coordinate system (78) that is referenced to the image sensor (46) of the camera (34); and
  determining the imaging scale and the distortion of the optical imaging system of the camera (34).

Clause 33: The method according to clause 32, wherein the absolute position of the abutment (17) is determined by measuring test objects with a known geometry using an optimization method.

Clause 34: The method according to clause 32 or 33, wherein the imaging scale is determined by measuring the brightness distribution (79) of a disk-shaped test object (76) on the image sensor (46).

Clause 35: The method according to any one of clauses 32 to 34, wherein the extent of the adjustment axis (52) of the image sensor (46) is determined in a coordinate system (78) that is referenced to the image sensor (46).

Clause 36: The method according to any one of clauses 32 to 35, comprising the following steps:
  i) determining reflections of the light spots, typically point light sources (20), at the lens element, typically field lens element (80);
  ii) suppressing these reflections in the brightness distribution (79) captured in relation to a test object on the image sensor (46).

Clause 37: A method for measuring the topography and/or the gradients and/or the curvature of an optically effective surface (18) of an article (12), comprising the following steps:
  i. arranging the article to be measured on an abutment resting against the article (12) in a recording region (14);
  ii. capturing a brightness distribution (79) composed of luminous spots (57), the brightness distribution being caused on an image sensor (46) by the light of one or more light spots, typically point light sources (20), that is reflected at the surface (18) to be measured;
  iii. establishing the absolute and/or relative position of the luminous spots (57) on the image sensor (46), typically establishing the centroids (58) of the luminous spots on the image sensor (46);
  iv. assigning the brightness distribution to the light spots, typically point light sources (20), causing the brightness distribution;
  v. determining reflection locations on the article (12) for the light emitted by the light spots, typically point light spots (20);
  vi. calculating surface normals $\vec{n}$ at the reflection locations for the light emitted by the light spots, typically point light sources (20); and
  vii. calculating the topography of the article (12) by integrating the surface normals
  viii. iteratively repeating steps v. to vii. up to a convergence criterion; and
  ix. establishing the relative position of at least one point (50) on the surface (18) of the article (12) in a coordinate system (78) that is fixed relative to an apparatus.

Clause 38: A computer program having program code for the calibrating an apparatus (10) for measuring the topography and/or the gradient and/or the curvature of an optically effective surface (18) of an article (12) embodied according to any one of clauses 22 to 26 in a method according to any one of clauses 27 to 36 or having program code for implementing steps iii. to ix. in the method specified in clause 37.

BRIEF DESCRIPTION OF THE DRAWINGS

The disclosure will now be described with reference to the drawings wherein.

DESCRIPTION OF EXEMPLARY EMBODIMENTS

Figure 1:
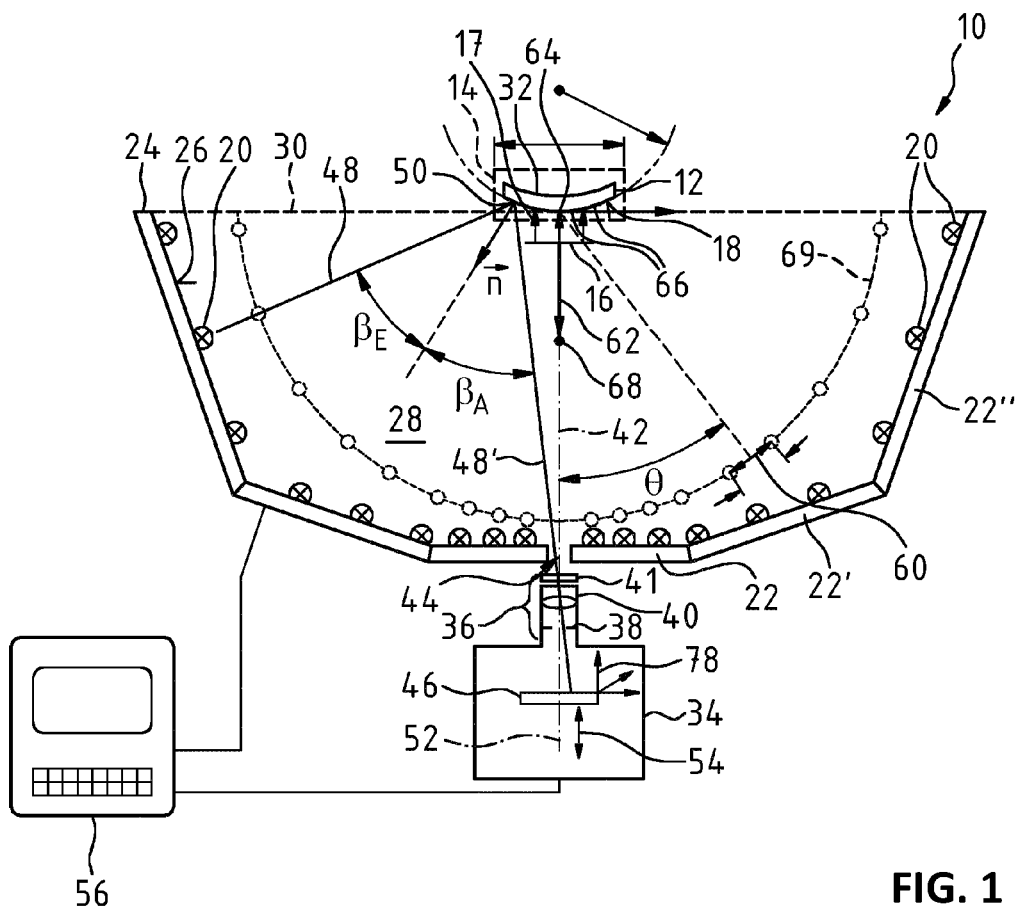
FIG. 1 shows a first apparatus for measuring the topography and/or the gradient and/or the curvature of an article in the form of a spectacle lens using point light sources.

The apparatus 10 that is shown in FIG. 1 is configured to measure the topography and/or the gradient and/or the curvature of an article 12 in the form of a spectacle lens. The apparatus 10 has a recording region 14, in which the article 12 can be arranged on a three-point bearing 16. The three-point bearing 16 is a device for arranging the article 12 in the recording region 14. The three-point bearing 16 holds the article 12 on spherical abutments 17 at three points on an optically effective surface 18 to be measured.

The apparatus 10 comprises a multiplicity of point light sources 20 in the form of LEDs, which, in the case of activation, emit light in the ultraviolet spectral range, at a wavelength of 365 nm. These light-emitting diodes are embodied as SMDs and arranged on printed circuit boards 22, 22', 22", which are assembled to form a carrier structure 24. Approximately 2000 point light sources 20 are situated on the carrier structure 24 with the printed circuit boards 22, 22', 22".

In the apparatus 10, the point light sources 20 are positioned on a hypersurface 26 in the form of a lateral surface of a polyhedron. The carrier structure 24 assembled from the printed circuit boards 22, 22', 22" has an edged form and therefore great vibrational stability. In the apparatus 10, the hypersurface 26 delimits a three-dimensional half-space 28, which has an open edge 30. Ultraviolet (UV) light at a wavelength of $\lambda \approx 365$ nm is absorbed in the glass material of commercially available spectacle lenses made of plastic. What this achieves is that the light of the point light sources 20, at the optically effective surface 32, which, in the recording region 14, lies opposite the optically effective surface 18 of an article 12 in the form of a spectacle lens, does not cause reflections that bother the measurement of the optically effective surface 18.

To measure spectacle lenses made of quartz glass in the apparatus 10, the point light sources 20 produce light, the following applying to the wavelength $\lambda$ thereof: $\lambda \leq 300$ nm. Light of this wavelength renders it possible to suppress bothersome reflections of the light of the point light sources 20 from the rear side of an article 12 in the form of a spectacle lens.

In principle, metallic surfaces and lacquered surfaces can also be measured in the apparatus 10, with, in this case, the wavelength of the light of the point light sources 20 expediently lying in the visible spectral range. For the purposes of measuring rough surfaces, where the following applies to the roughness Rz thereof:

$Rz > 1 \mu m$, it is advantageous if the point light sources 20 emit light, whose wavelength lies in the infrared spectral range, since rough surfaces have a mirror effect for this light.

The apparatus 10 contains a camera 34 with an optical imaging system 36, which has a stop 38, a lens assembly 40 with lenses and a UV band-elimination filter 41. The optical imaging system 36 has an optical axis 42 that passes through the recording region 14. The camera 34 is arranged on the side of the carrier structure 24 with the printed circuit boards 22, 22', 22" facing away from the recording region 14. It captures an article 12 in the form of a spectacle lens, which is positioned in the recording region 14, through a recess 44 in the printed circuit board 22 of the carrier structure 24.

The camera 34 serves to capture a brightness distribution, which is caused on an image sensor 46 by the light of the point light sources 20 that is reflected at the surface 18 to be measured. With the light beam 48, the light from a point light source 20 reaches the surface 18 of the article 12 in the form of a spectacle lens, which is arranged in the recording region 14. At the point 50 with the coordinates $(X_S, Y_S, Z_S)$, the light with the angle of incidence $\beta_E$ in relation to the surface normal $\vec{n}$ is reflected at the angle of reflection $\beta_A = \beta_E$ according to the law of reflection. Then, this light reaches the camera 34 as a light beam 48'.

Consequently, the brightness distribution on the image sensor 46 contains information about the inclination of the tangential planes at the surface 18 of the article 12 in the form of a spectacle lens to be measured, at those points at which the light of the point light sources 20 is reflected in such a way that it is caught by the camera 34.

The imaging system 36 of the camera 34 is set in such a way that a brightness distribution captured on the image sensor 46 does not experience vignetting as a result of the recess 44 and the depth of field is so large that the brightness distributions for optically effective surfaces of articles 12 in the form of spectacle lenses, which have different surface topographies and which are measured in the apparatus 10, can be resolved on the image sensor 46. Here, the image sensor 46 can be displaced in linearly movable fashion, in a manner corresponding to the double-headed arrow 54, along an adjustment axis 52 that passes through the lens assembly 40.

The arrangement of the point light sources 20 on the carrier structure 24 in the apparatus 10 ensures that the topography of an optically effective surface 18 can be measured with a good resolution, even if the surface is inclined at an angle of up to 45° in relation to the optical axis 42 of the imaging system 36 of the camera 34. This is because the light of the point light sources 20 is then reflected in such a way that it is supplied to the image sensor 46 in the camera 34 through the recess 44 in the carrier structure 24.

The computer unit 56 is a device for activating different point light sources 20. It serves to capture the brightness distribution caused on the image sensor 46 of the camera 34 by the light of the point light sources 20 that was reflected at the optically effective surface 18.

Figure 2:
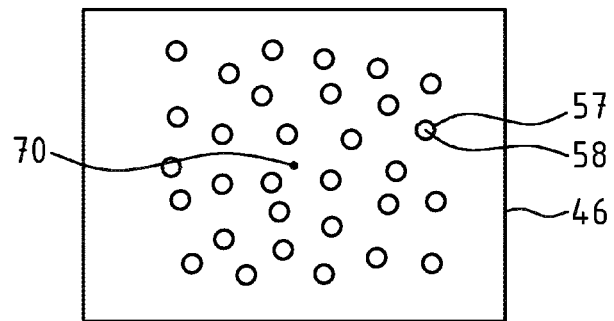
FIG. 2 shows a brightness distribution on an image sensor of a camera in the apparatus.

FIG. 2 shows such a brightness distribution on the image sensor 46. The brightness distribution has a multiplicity of luminous spots 57 with a centroid 58 as a geometric center of the luminous spots; the location (x, y) thereof in the plane of the image sensor 46 contains the information about the topography and/or the gradients and/or the curvature of an optically effective surface 18 of the article 12.

To evaluate a brightness distribution captured by the image sensor 46 in the camera 34, the computer unit 56 in the apparatus 10 contains a computer program, which is stored in a memory of the computer unit 56. For a light beam 48' captured by the camera 34 on the image sensor 46, the light beam 48' emanating from a point 50 on the optically effective surface 18 of the article 12 arranged in the recording region 14, the computer program, using a processor of the computer unit 56, calculates the surface normal $\vec{n}$ at this point on the basis of machine parameters of the apparatus 10, which were established in a calibration method. Then, the topography of the surface 18 is calculated by integration and interpolation in an iteration method, wherein known coordinates of at least one point of the surface 18 and the brightness distribution captured by the image sensor 46 are resorted to. To this end, the computer program in the computer unit 56 uses computer algorithms, which depend on the apparatus constants or machine parameters of the apparatus 10. Here, the computer program and the computer unit 56 also facilitates the calculation of the local refractive powers of the optically effective surface 18 from the calculated topography of the article 12, and also the calculation of the curvature and the gradient of the optically effective surface 18.

FIG. 1 shows that the number of point light sources 20 in a solid angle element 60 of the unit sphere with the solid angle coordinates θ (polar angle),φ (azimuth angle) in a spherical coordinate system 62, the origin of which lies at the center of symmetry 64 of the three-point bearing 16 and which has a north pole 68 pointing to the camera 34, decreases with increasing polar angle θ.

By contrast, the number of point light sources 20 in a solid angle element 60 about the center of symmetry 64 of the three-point bearing 16 is substantially independent of the azimuth angle φ for a given polar angle θ.

In order, in the apparatus 10, to determine the surface normals at $N^2$ nodes 66, which are arranged equidistantly from one another, of an optically effective surface 32 of an article 12 with the radius of curvature R, which is arranged in the recording region 14, it is necessary that the central projections of two neighbouring point light sources 20 on the carrier structure 24 onto a hemisphere 69 with the radius $R_H$, which is spanned about the center of symmetry 64 of the three point bearing 16, have the following distance d(θ) in the direction of the polar angle θ:

$$d(\theta) \cong \frac{R_H \cdot 2\theta}{N} \leq \frac{R_H \cdot 4}{N} \sin^{-1} \frac{BF}{2R}$$

In the apparatus 10, the arrangement of the point light sources 20 is adapted to a predetermined number of nodes by virtue of the distance d(θ) in the interior of the hemisphere 69 being reduced and continuously increasing to the outside.

When seen from each point lying within the recording region 14, the point light sources 20 in the apparatus 10 are distributed over a solid angle Ω, which satisfies the following relationship: Ω≥Π sr, typically Ω≥1.8 π sr.

In an alternative exemplary embodiment of the apparatus 10, the recording region 14 has a displaceable implementation in relation to the arrangement of the point light sources 20 received at the carrier structure 19. In this way, it is possible to vary the solid angle Ω over which the point light sources 20 are distributed, as seen from points lying within the recording region 14.

To be able to accurately calculate the topography of the optically effective surface 18 of an article 12 in the form of a spectacle lens with a computer program in the computer unit 56, the apparatus quantities in relation to the apparatus 10 in the form of machine parameters, i.e., apparatus constants of the apparatus 10, which are listed below, must be known:

size of the light-sensitive area of the image sensor 46 and the spacing of the light-sensitive sensor pixels;

scale of the optical imaging of the camera 34;

spatial absolute and/or relative position of the image sensor 46 of the camera 34 in relation to the optical axis 42 of the optical imaging system 36 of the camera 34;

distortion of the optical imaging system 36 of the camera 34;

lateral displacement of the camera;

position, i.e., the coordinates, of each point light source 20 in a coordinate system 78 that is fixed in relation to the apparatus and referenced to the image sensor 46 of the camera 34; and coordinates of the center and radius of the spherical abutment in a coordinate system 78 that is fixed in relation to the apparatus and referenced to the image sensor 46 of the camera 34.

The aforementioned apparatus constants can have values that differ in each individual apparatus 10, even in the case of apparatuses 10 which, in principle, have the same construction; this is due to different conditions of individual assemblies inserted therein and due to manufacturing tolerances.

Thus, for an apparatus 10 for measuring the topography of an article 12 in the form of a spectacle lens, as shown in FIG. 1, these apparatus constants must be determined in a calibration method before the apparatus can be used to measure the topography and/or the gradient and/or the curvature of an optically effective surface of the article 12 with corresponding accuracy.

Figure 3:
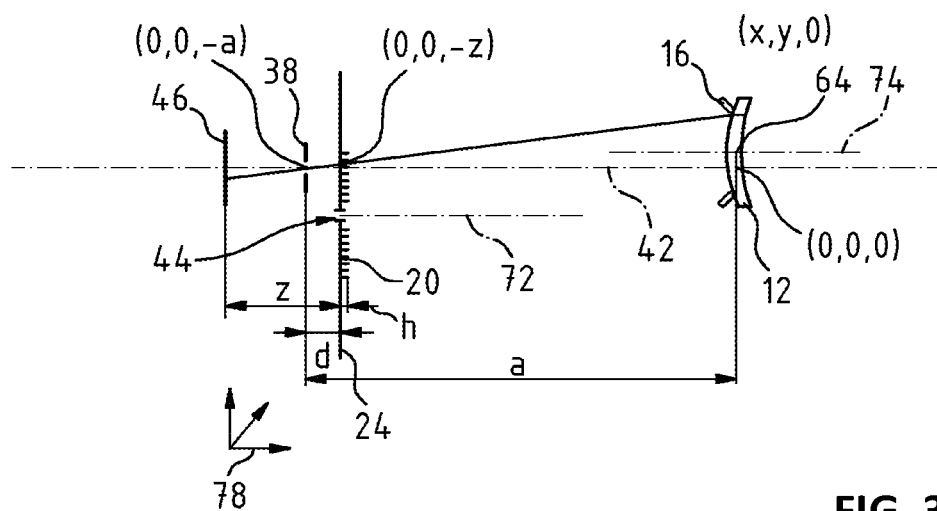
FIG. 3 shows the influence of manufacturing tolerances on apparatus constants of the apparatus.

FIG. 3 shows the influence of different manufacturing tolerances on different apparatus constants of the apparatus 10. On a microscopic scale, the optical axis 42 of the optical imaging system 36 of the camera 34 is arranged offset to the center 70 of the image sensor 46. In general, the axis of symmetry 72 of the carrier structure 24 differs from the optical axis 42 of the optical imaging system 36 of the camera 34 and from the axis of symmetry 74 of the three-point bearing 16. The point light sources 20 emit the light at a distance h from the surface of a printed circuit board 22. The printed circuit board 22 with the recess 44 is arranged at the distance d from the stop 38 of the optical imaging system 36 of the camera 34. The image sensor 46 is positioned at the distance z from the stop 38 of the optical imaging system 36 of the camera 34. The center of symmetry 64 of the three-point bearing 16 has the distance a from the plane of the stop 38 of the optical imaging system 36 of the camera 34.

Exact knowledge of the apparatus constants is obligatory so that a high measurement accuracy can be obtained with the apparatus for measuring the topography of an article 12 in the form of a spectacle lens.

Thus, the knowledge of the size of the light-sensitive area of the image sensor 46 and the distance of the light-sensitive sensor pixels from one another is necessary, with knowledge of the imaging scale of the imaging system 36 of the camera 34, to be able to deduce the absolute and/or relative position of a point 50 on the optically effective surface 18 of an article 12 in the form of a spectacle lens, at which point a light beam 48 that is incident on the article 12 is reflected.

Knowledge about the distortion of the optical imaging system 36 of the camera 34 is necessary to be able to specify an imaging scale in relation to the light points captured by the image sensor 46.

The knowledge of the position, i.e., the coordinates, of a spherical abutment in a coordinate system 78 that is fixed in relation to the apparatus and referenced to the image sensor 46 of the camera 34 is necessary in order to be able to specify the coordinates of a point 50 on the optically effective surface 18 of the article 12 in the form of a spectacle lens when the article 12 is received in the three-point bearing 16.

Knowledge of the position, i.e., the coordinates, of each point light source 20 in a coordinate system 78 that is fixed in relation to the apparatus and referenced to the image sensor 46 of the camera 34 and knowledge of the spatial absolute and/or relative position of the image sensor 46 of the camera 34 in relation to the optical axis 42 of the optical imaging system 36 of the camera 34 is required in order, by means of triangulation, to be able to deduce the accurate absolute and/or relative position of points of reflection on the optically effective surface 18 of an article in the form of a spectacle lens.

Figure 4:
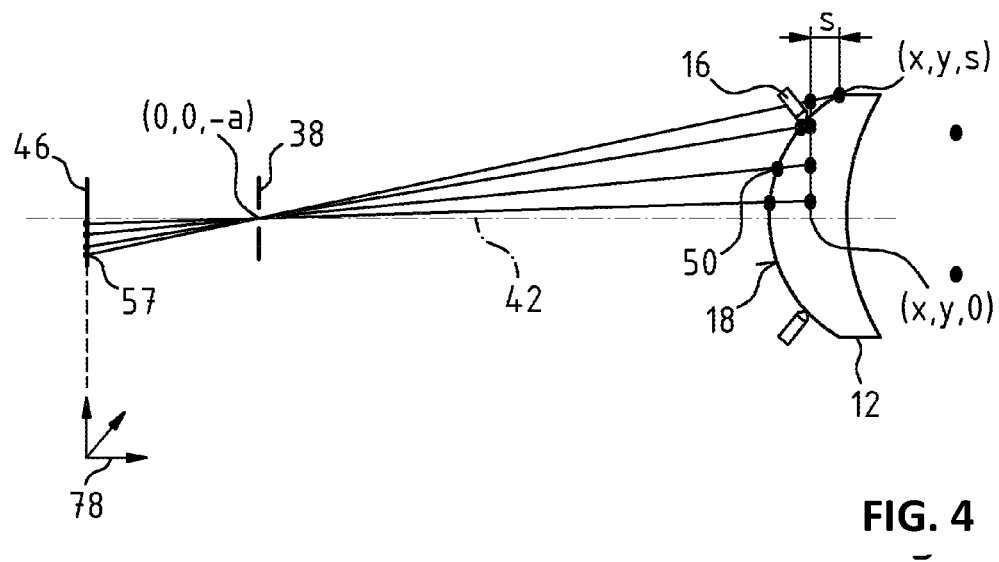
FIG. 4 and FIG. 5 show the spatial relationship of the reflection points for the light at the article in the form of a spectacle lens, captured on the image sensor, and the relative position of the point light sources in the apparatus.
Figure 5:
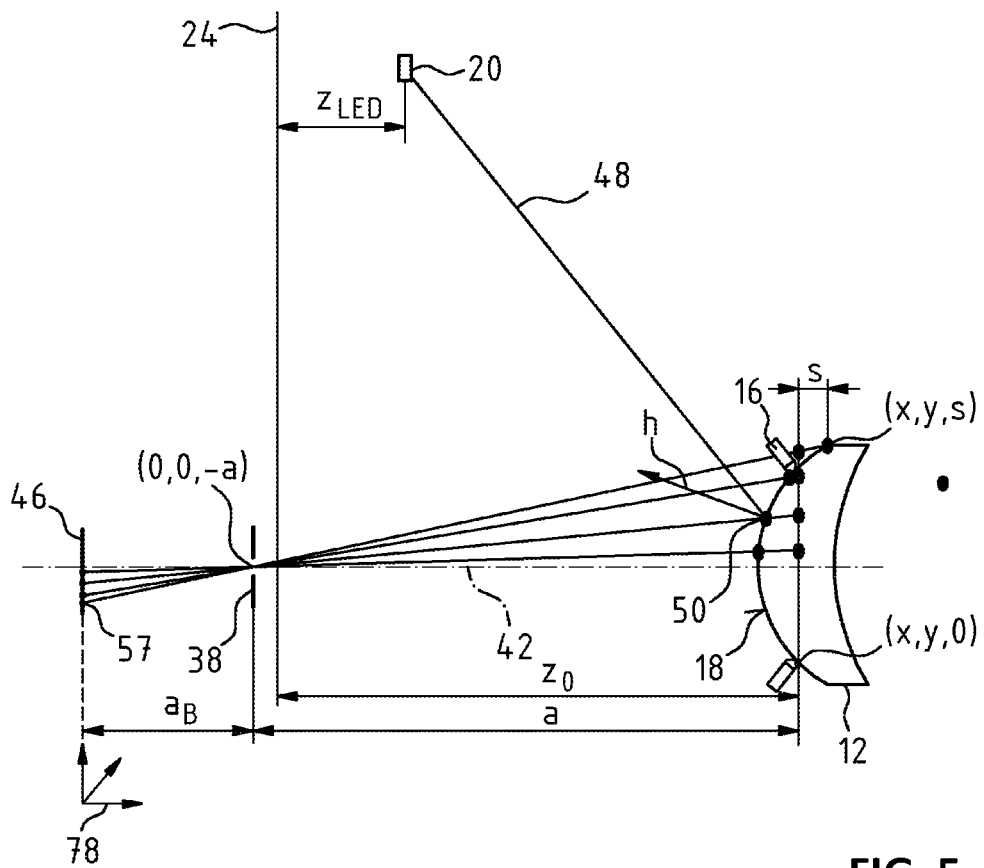

The exact calculation of the topography of the optically effective surface 18 of an article 12 in the form of a spectacle lens is explained below on the basis of FIG. 4 and FIG. 5.

The computer program in the computer unit 56 of the apparatus makes use of an algorithm for the purposes of calculating the topography of the optically effective surface 18 of the article 12 in the form of a spectacle lens, the algorithm carrying out the following steps:

Step 1: determining the centroids 58 of the individual luminous spots 57 in a brightness distribution on the light-sensitive surface of the image sensor 46.

Step 2: assigning the centroids 58 of a luminous spot 57 in a brightness distribution on the light-sensitive surface of the image sensor 46 to a certain point light source 20.

Step 3: determining the point 50 of the reflection on the optically effective surface 18 of the article 12 for each centroid 58.

Step 4: calculating the surface normal $\vec{n}$ on the optically effective surface 18 of the article 12 for each centroid 58.

Step 5: calculating the topography, e.g., as form and/or sag s of the optically effective surface 18, by integrating the surface normal $\vec{n}$, i.e., by integrating the directional derivatives of the surface 18 determined by the surface normals $\vec{n}$.

Step 6: calculating the local curvatures of the optically effective surface 18 of the article 12 by differentiating the surface normal $\vec{n}$, i.e., by differentiating the entries of the vector of the surface normal $\vec{n}$.

Steps after Step 6: iteratively repeating steps 4 to 6 up to a convergence criterion.

The convergence criterion means that iterative steps 4 to 6 are repeated until a normal difference of topographies calculated in two successive steps is less than a predetermined tolerance.

To determine the absolute and/or relative position of the image of the individual point light sources 20, captured by the camera 34, the centroids 58 are calculated as the centroids of the intensity of the intensity distributions of an individual luminous spot 57 caused by the light of a point light source 20 on the image sensor 46. Here, a luminous spot 57 is defined by a pixel neighborhood that is provided by a manual or automatically calculated filter. Then, the centroid is calculated by propagating each (x, y)-position to the closest center, taking account of a gradient increase or a mean shift. In order to shorten the computation time required to this end, the signal of the image sensor 46 is filtered in order to free the image signal of the image sensor 46 from bothersome noise and insignificant background signals. This then leads to the (X, Y) coordinates of the images of the individual point light sources 20 in the plane of the light-sensitive surface of the image sensor 46.

Here, these coordinates can be estimated with sub-pixel accuracy. In the case of 2000 point light sources and a camera with 4 MPixel, this yields an advantageous data reduction of approximately 4 000 000/4000=1000/1. After estimating the centroids from the image data, there is an assignment of the (X, Y)-position to a point light source 20.

On account of the reflection on the optically effective surface 18 of the article 12, the brightness distribution caused by the point light sources 20 on the light-sensitive surface of the image sensor 46 is generally distorted. However, the absolute and/or relative position of the luminous spots 57 is maintained in a grid network that is defined by the arrangement of the point light sources 20 on the carrier structure 24. By virtue of the article 12 being illuminated in the apparatus 10 by a special sequence or group of point light sources 20, the sequence or group being formed by individual point light sources 20 or else a ring of point light sources 20, which are closest in relation to the camera 34, the direct assignment of at least one intensity distribution on the light-sensitive surface of the image sensor 46 to a certain point light source 20 is facilitated. Then, proceeding from this point light source 20, the following point light sources 20 are assigned on account of their neighborhood relationships, and so a list of origins arises.

Figure 6A:
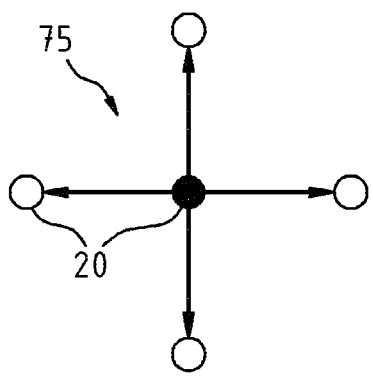
FIG. 6A and FIG. 6B show the assignment of reflection points for the light, captured on the image sensor, from different point light sources in the apparatus.
Figure 6B:
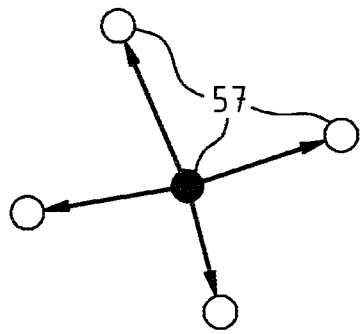

FIG. 6A and FIG. 6B explain the assignment of individual luminous spots 57 on the image sensor 46 when resorting to the point light sources 20 underlying these luminous spots 57 with the computer program in the computer unit 56. This assignment is implemented incrementally. Here, in each assignment step, the computer program makes use of a list of point light sources 20, which are active and in a known grid network. With knowledge of the grid network 75 shown in FIG. 6A, the luminous spots 57 of adjacent point light sources 20 that are observed on the image sensor 46, shown in FIG. 6B, are assigned to one another. By way of example, this can be implemented, initiated on the basis of a so-called origin list. However, as an alternative thereto, it is also possible to undertake the assignment on the basis of a list of point light sources 20 that have already been assigned and likewise are initiated with the origin list. After the assignment step of the neighbors, all newly assigned point light sources 20 then are adopted in the list of the active point light sources 20, wherein the old entries of this list are copied into the list of the already assigned point light sources 20. Here, care is taken that there are no common point light sources 20 in both lists. This leads to a spatial expansion of the assignment on the two-dimensional grid of point light sources 20 and even allows the assignment of point light sources 20 if no point light sources are situated at individual grid points of the grid.

For a luminous spot 57 that is assigned to an active point light source 20, the closest neighbors must correspond to the adjacent point light sources 20. To this end, as shown in FIG. 6A, a simple Euclidean distance is taken as a neighborhood relationship. The respective active point light source 20 then forms the origin of a local coordinate system. Here, a vector corresponds to each neighborhood point, a corresponding vector of the reference having to be assigned to the vector. This assignment is implemented by minimizing the sum of the vector dot products, corresponding to a minimum overall angle distortion of the assignment. By way of example, this minimization can be implemented by applying the so-called Hungarian method on the basis of the Kuhn-Munkres algorithm.

However, as an alternative thereto, it is also possible to carry out the corresponding assignment of light spots on the image sensor 46 and point light sources 20 by recording image sequences. Here, point light sources 20 are actuated in groups or individually and a sequence of images is recorded with the image sensor 46. Then, the assignment is implemented by analyzing the corresponding image sequence. Here, all point light sources 20 can be numbered in the entirety thereof by way of their sequence code, i.e., on-off, for example. However, to this end, it is also possible for the point light sources to be only provided locally with a code. Then, this is a development of the algorithm described above, which assigns the point light sources 20. Here, it should be noted that the corresponding prescription for the local assignment can be modifiable in space or time.

For the purposes of a unique global assignment of all possible luminous spots to all point light sources 20 in the apparatus 10, $\log_2$ [number of point light sources]

individual images are required in a sequence. By way of example, if the apparatus 10 for measuring the topography contains 48 point light sources 20, eleven individual images are required for a global assignment and three individual images are required for a local assignment.

Taking account of the imaging scale and the optional distortion correction, the incident light ray i is then calculated for each centroid 58 using the computer program of the computer unit 56. Here, the optics of the imaging system 36 of the camera 34 is modeled as a thick lens after taking account of the distortion. Then, the incident light ray is described as follows:

$$\vec{l} = \vec{l}_0 + m \cdot \vec{l}_n = \begin{pmatrix} 0 \\ 0 \\ -a \end{pmatrix} + m \begin{pmatrix} -x_c \\ -y_c \\ as \end{pmatrix}$$

Here, the optically effective surface 18 of the article 12 in the form of a spectacle lens is provided as a numerical model surface, which is defined either from the preceding analysis iteration or by initiation as a plane. Therefore, the location of the reflection is given by the intersection of the ray with this surface and determined numerically by an optimization according to the parameter m. Here, the Euclidean distance of the ray point i(m) to the surface is minimized. The next point of the surface is then calculated by a nearest neighbor interpolation.

A surface normal $\vec{n}$ of the reflecting surface emerges as follows from the reflection equations:

$$\vec{n} = \frac{\vec{r}_n - \vec{l}_n}{\|\vec{r}_n - \vec{l}_n\|}$$

Here, $\vec{r}_n$ is the direction that connects a point light source 20 and the point 50 on the optically effective surface 18 of the article 12, on which an incident beam impinges, wherein the following applies:

$$\vec{r} = \begin{pmatrix} x_s \\ y_s \\ z(x_s, y_s) \end{pmatrix} + m \cdot \vec{r}_n$$

and $$\vec{l} = \vec{l}_0 + m \cdot \vec{l}_n = \begin{pmatrix} 0 \\ 0 \\ -a \end{pmatrix} + m \begin{pmatrix} -x_c \\ -y_c \\ as \end{pmatrix}$$

By virtue of the surface of the test object being parameterized as a surface function $z(x_s, y_s)$, the following emerges for the surface normal $\vec{n}$:

$$\vec{n} = \begin{pmatrix} -\frac{\partial x}{\partial z} \\ -\frac{\partial y}{\partial z} \\ 1 \end{pmatrix} = \begin{pmatrix} -\partial_z x \\ -\partial_z y \\ 1 \end{pmatrix}$$

Then, this equation is directly solved according to the derivatives $\partial_z x$ and $\partial_z y$ of the optically effective surface 18 of the article 12 in the form of a spectacle lens, i.e., the surface of the article. Hence, the derivatives of the surface at the locations (xs, ys) are obtained; however, as a rule, the locations are distributed in irregular fashion on account of the distortion of the surface on the article 12. Then, for integration purposes, the derivatives are initially interpolated onto a regular polar grid, which makes the method robust against individual points missing. On the polar grid, the x, y-derivatives are converted to polar derivatives thereon, i.e., to derivatives according to radius r and angle φ in accordance with the chain rule of the differential equation. The numerical, polar derivative on the polar grid is then described by a Jacobian matrix A, which corresponds to the so-called N-point finite-difference method. Here, by implementing von Neumann boundary conditions, the edge points are modeled as a one-sided derivative. Here, a constraint matrix C, which describes the measured height of the test object at the bearing points and the polar condition $z(0,\varphi) = z(0)$, is defined in addition to the Jacobian matrix. The topography of the surface z then emerges from the solution of the linear system of equations:

$$\begin{pmatrix} A^T A & C^T \\ C & 1 \end{pmatrix} z = \begin{pmatrix} \partial_r^2 z + \partial_\varphi^2 z \\ z(r=0) \\ z(\text{bearing}) \end{pmatrix}$$

As an alternative thereto, the integration can also be implemented by the fit of local basis functions. Here, the area is modeled as a linear combination of basis functions, e.g., as a linear combination of biharmonic splines.

The derivative of this linear combination then is the linear combination of the derivatives of the basis functions. This leads to a linear system of equations, which can be solved according to a weighting of the linear combination. The constraint of the bearing should also be taken into account here, as described above. The final area finally is the linear combination of the established weightings with the basis functions.

Then, the local curvatures of the surface are calculated directly by the differential-geometric relationships from the surface inclinations $\partial_z x$ and $\partial_z y$. By way of example, Gaussian curvature K:

$$K = \frac{\partial_x^2 z \cdot \partial_y^2 z - \partial_{xy}^2 z}{(1 + \partial_x z^2 + \partial_x z^2)^2}$$

The topography of the optically effective surface 18 of the article 12 in the form of a spectacle lens is finally established in an iterative method. After initializing z with a standard form, e.g., a plane or a sphere with a predefined radius, the derivative is calculated and the topography is newly determined by an integration. These steps are repeated until the determined topography changes less than a termination criterion. The convergence of the method is ensured by virtue of the distance a of the principal planes of the article 12 in the form of a spectacle lens and of the imaging system 36 of the camera 34 being large, and so the Banach fixed point theorem applies in the present case.

An accurate calculation of the topography of the optically effective surface 18 of an article 12 in the computer unit 56 requires the accurate knowledge of the position of a point on the surface of the test object in a coordinate system that is referenced to the image sensor 46 of the camera 34.

Figure 7:
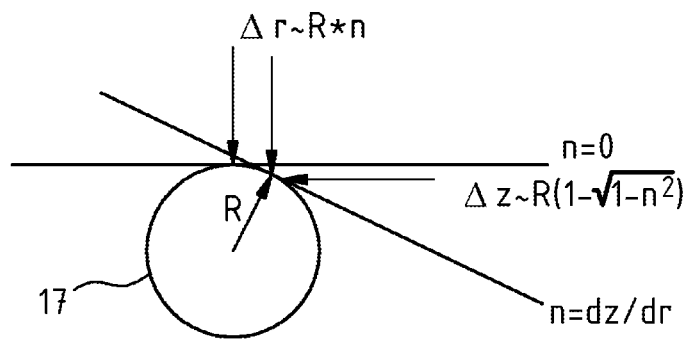
FIG. 7 shows the establishment of the abutment point of an optically effective surface of an article to be measured, at an abutment in the apparatus.

As explained below on the basis of FIG. 7, the abutment points of the article 12 in the form of a spectacle lens at a spherical abutment 17 of the three-point bearing 16 is established by calculation in the computer unit 56 as follows:

The optically effective surface 18 of the article 12 is locally modeled as a spherical surface in the region of a spherical abutment of the three-point bearing 16 in a first step.

Thereupon, the contact point of this spherical surface with the spherical surface of the corresponding spherical abutment is determined on the basis of a known radius and on the basis of a known center of the spherical abutment.

The machine parameter of the size of light-sensitive surface of the image sensor 46 and the spacing of the light-sensitive sensor pixels arranged thereon emerges from the usual manufacturer's information in relation to image sensors or image sensors in a camera.

In order to establish the following machine parameters or apparatus constants:

scale of the optical imaging of the camera 34;

spatial absolute and/or relative position of the image sensor 46 of the camera 34 in relation to the optical axis 42 of the optical imaging system 36 of the camera 34;

distortion of the optical imaging system 36 of the camera 34;

lateral displacement of the image sensor 46 of the camera 34;

position, i.e., the coordinates, of each point light source 20 in a coordinate system 78 that is fixed in relation to the apparatus and referenced to the image sensor 46 of the camera 34; and coordinates of the center and radius of the spherical abutment in a coordinate system 78 that is fixed in relation to the apparatus and referenced to the image sensor 46 of the camera 34;

the apparatus 10 is operated in a calibration mode.

In detail, the following steps are implemented to this end:

Scale

Figure 8A:
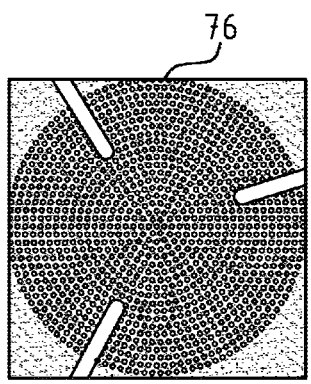
FIG. 8A shows the image of a disk-shaped test object arranged in the apparatus for the purposes of determining machine parameters or apparatus constants.

To establish the scale of the optical imaging of the camera 34, the calibration disk in the form of a disk-shaped test object 76, shown in FIG. 8A, is measured using the apparatus 10. This test object 76 is a blackened metal plate, in which a defined, precisely known pattern has been introduced. For measurement purposes, the test object 76 is inserted into the three-point bearing 16 of the apparatus 10. Then, different images of the test object 76 are recorded by the camera 34, the position of the image sensor 46 of the camera 34 being displaced in the direction of the adjustment axis 52 according to the double-headed arrow 54 while the images are being recorded. Here, in accordance with the position of the image sensor 46 of the camera 34, the image of the pattern of the test object 76 changes on the image sensor 46 on account of the change in the imaging scale connected to the displacement.

Distortion

To establish the distortion of the optical imaging system 36 of the camera 34, the imaging scale, the image distance and the object distance are determined for different positions of the image sensor 46 along the adjustment axis 52 thereof from known information in relation to the size of the light-sensitive surface of the image sensor 46 and the spacing of the light-sensitive sensor pixels arranged thereon.

As an alternative or in addition thereto, it is also possible to evaluate local deviations between the image of the disk-shaped test object 76 and the known, actual form of the disk-shaped test object 76 in order thus to determine a distortion correction for the imaging optical unit by virtue of a correction vector being calculated for each sensor pixel of the image sensor 46 of the camera 34. This correction vector then renders it possible to deduce corresponding real spatial coordinates from the image data in relation to an article 12 recorded by the camera 34.

Moreover, it is alternatively or additionally also possible to deduce the exact position of the image sensor 46 relative to the optical axis 42 of the imaging system 36 of the camera 34 from recordings of the disk-shaped test object 76 with the camera 34 at different positions of the image sensor 46 along the adjustment axis 52 thereof Lateral Displacement of the Image Sensor, Magnification and Distortion To establish the lateral displacement of the image sensor 46 of the camera 34 relative to the optical axis 42, a plurality of images of the disk-shaped test object 76 are once again captured at different positions of the image sensor 46 along the adjustment axis 52. On the basis of a regression of observed points, spots or image regions corresponding to one another in relation to the real displacement of the image sensor 46, the optical axis 42 of the optical imaging system 36 of the camera 34, the magnification scale and the distortion of the optical imaging system 36 are then determined directly. What is exploited here is that if the adjustment axis 52 of the image sensor 46 is exactly parallel to the optical axis 42 of the camera 34, points corresponding to one another that were extracted from an image scale linearly about a defined point that corresponds to the intersection of the optical axis 42 with the plane of the image sensor 46.

It should be noted that the adjustment axis 52 of the image sensor 46 of the camera 34 does not necessarily exactly coincide with the optical axis 42 of the optical imaging system 36 of the camera 34. In the case of a displacement of the image sensor 46 and the defocus connected therewith, these circumstances lead to a x, y-drift of the luminous spots 57 of the brightness distribution in the plane of the image sensor 46. However, this drift can be determined by measuring a so-called scaling point of the apparatus 10 in the form of the vertex or the circumcenter of the three-point bearing 16. The aforementioned scaling point is distinguished in that, when measuring spherical articles with a different curvature in the apparatus 10, an identical focus setting of the optical imaging system 36 of the camera 34 causes the luminous spots 57 of the brightness distribution to always scale in a radially symmetric manner about this point. Therefore, by way of a corresponding regression of image data of the image sensor 46, it is possible to determine the sought-after scaling point in the same way as in the above-described establishment of the imaging scale.

Here, a migration of the scaling point can be uniquely traced back to a drift of the sensor plane. As a consequence thereof, the drift accompanying the displacement of the image sensor 46 can be established as a function of the position of the image sensor 46 on the adjustment axis 52, i.e., the Z-coordinate, and can then be compensated. Here, the scaling point is determined as a limit value in the form of the center point of the pattern of the point light sources 20 in the image hypothetically captured by the camera 34, the image corresponding to a sphere with the radius of 0 that is measured in the apparatus 10.

The apparatus constants of the apparatus 10, explained above, are typically determined in the computer unit 56 using an optimization method, which is based on measuring a plurality of spherical test bodies with different radii.

Position of Each Point Light Source

The position of each point light source 20 in the apparatus 10 is established by evaluating images, captured by the camera 34, with a brightness distribution 79 of reflections of the light of the point light sources 20 at test bodies with a known geometry on the basis of an optimization method.

Figure 8B:
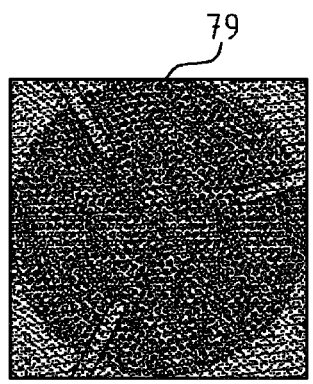
FIG. 8B shows a brightness distribution, captured by the image sensor of the apparatus, of reflections of the light of the point light source at a sphere, for the purposes of determining machine parameters or apparatus constants of the apparatus.

By way of example, FIG. 8B shows a brightness distribution 79, captured by the image sensor 46 of the apparatus 10, of reflections of the light of the point light sources 20 at a sphere, for the purposes of determining machine parameters or apparatus constants of the apparatus 10. Here, use is made of the fact that, when measuring test bodies with different radii, the position of the point light sources 20, the light of which produces the brightness distributions captured by the image sensor 46, is the same in each case for the different test bodies. This boundary condition is used in the optimization method to calculate optimized positions of the point light sources 20 in the apparatus 10 from the brightness distributions of different test bodies.

In a modified configuration of this optimization method, the boundary condition of the position of the point light sources 20 is complemented by further boundary conditions, by means of which the geometry of the carrier structure 24 for the point light sources 20 is taken into account.

By way of example, if the carrier structure 24 is a hemisphere, all point light sources 20 lying on a spherical shell applies. If the carrier structure 24 is a hemisphere with form defects, this has the consequence that all point light sources 20 lie on an ellipsoid surface or spherical surface with disturbance contours, which can be described by Zernike polynomials, for example.

Finally, if the carrier structure 24 is a polyhedron and if the point light sources 20 are LEDs arranged on a printed circuit board, this means that the point light sources 20 of a corresponding group of point light sources 20 are situated on a common plane, wherein it is possible to exploit the fact that the SMD-equipping of printed circuit boards manufacturing method facilitates the positioning of LEDs with maximum deviations of <0.1 mm. By way of example, if the polyhedron is made of 16 printed circuit boards (PCBs) with five degrees of freedom and three abutment points each, it is only necessary to still determine 89 free parameters with the corresponding optimization method, i.e., around 6000 degrees of freedom in the case of 2000 LEDs, for example.

Coordinates of the Center and Radius of a Spherical Abutment

Figure 8C:
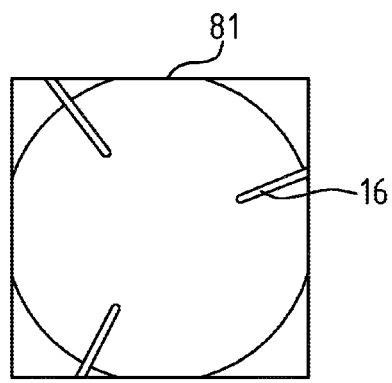
FIG. 8C shows the image of a white disk in the apparatus, for the purposes of determining machine parameters or apparatus constants of the apparatus.

To determine the bearing parameters, i.e., the coordinates of the centers of the bearing spheres in a coordinate system that is fixed in relation to the apparatus in the form of the coordinate system of the image sensor 46 of the camera 34, the camera 34 is initially used to record an image 81 of a white disk arranged in the three-point bearing 16 of the apparatus 10, as shown in FIG. 8C. Here, the white disk is illuminated by all point light sources 20. The center and the radius of the spherical bearings of the three-point bearing 16 in the apparatus 10 is then determined by calculation by means of image processing. The image 81 of the corresponding recording contains information required to this end. The spherical abutments 17 are imaged in the image 81 under perspective projections onto ellipses, from which then the parameters of the sphere center are determined on the basis of the known radius and the known imaging scale.

It is also possible to adopt as free parameters the sphere centers in x, y, z or only in z into the above-described optimization method for establishing the position of each point light source 20. Because this measure increases the number of degrees of freedom of the corresponding optimization method, this leads to the method converging somewhat slower.

However, it should be noted that the above-described optimization method can be used to determine the apparatus constants or machine parameters of the apparatus 10 in the form of the position, i.e., the coordinates, of a spherical abutment in a coordinate system 78 that is referenced to the image sensor 46 of the camera 34 and the position, i.e., the coordinates, of each point light source 20 in a coordinate system 78 that is referenced to the image sensor 46 of the camera 34 and the spatial absolute and/or relative position of the image sensor 46 of the camera 34 in relation to the optical axis 42 of the optical imaging system 36 of the camera 34 with, in principle, two different test bodies, too.

Moreover, it should also be noted that an option for establishing the bearing points also consists of measuring the three-point bearing 16 in the apparatus 10 using a coordinate measuring machine. To this end, the entire measurement system is placed on the main plate of a coordinate measuring machine. This allows the coordinates of the bearing points and the relative positions of the planes of the polyhedron and the relative and/or absolute position of the hemisphere to be determined.

In a simplified method, only the three-point bearing 16 is measured on a coordinate measuring machine. Thus, the relative absolute and/or relative position of the three bearing points in relation to one another is known.

All relative quantities, which are determined in advance as reliable and stable with external measurement methods reduce the numbers of open parameters in the optimization method and consequently increase the stability of the latter.

Moreover, it should be noted that corresponding bearing points can be determined in an optimization method using a known test object.

In addition, it should be noted that the sought-after coordinates of the abutment points can also be determined using a further measurement system that is integrated into the apparatus 10, the further measuring system containing a measuring probe, for example. For the purposes of referencing a point on the article 12, in the form of a spectacle lens, relative to the image sensor 46, it is further also possible, in principle, to establish the position of the article 12 with a measuring apparatus in a holder, which is matched to the apparatus 10 and the spatial dimensions of which are exactly known. Hence it is possible, when arranging the holder for the article 12, in the form of a spectacle lens, in the apparatus 10, to deduce the position of a corresponding point on the article 12, i.e., the coordinates thereof, in a coordinate system 78 that is referenced to the image sensor 46 of the camera 34.

Figure 9:
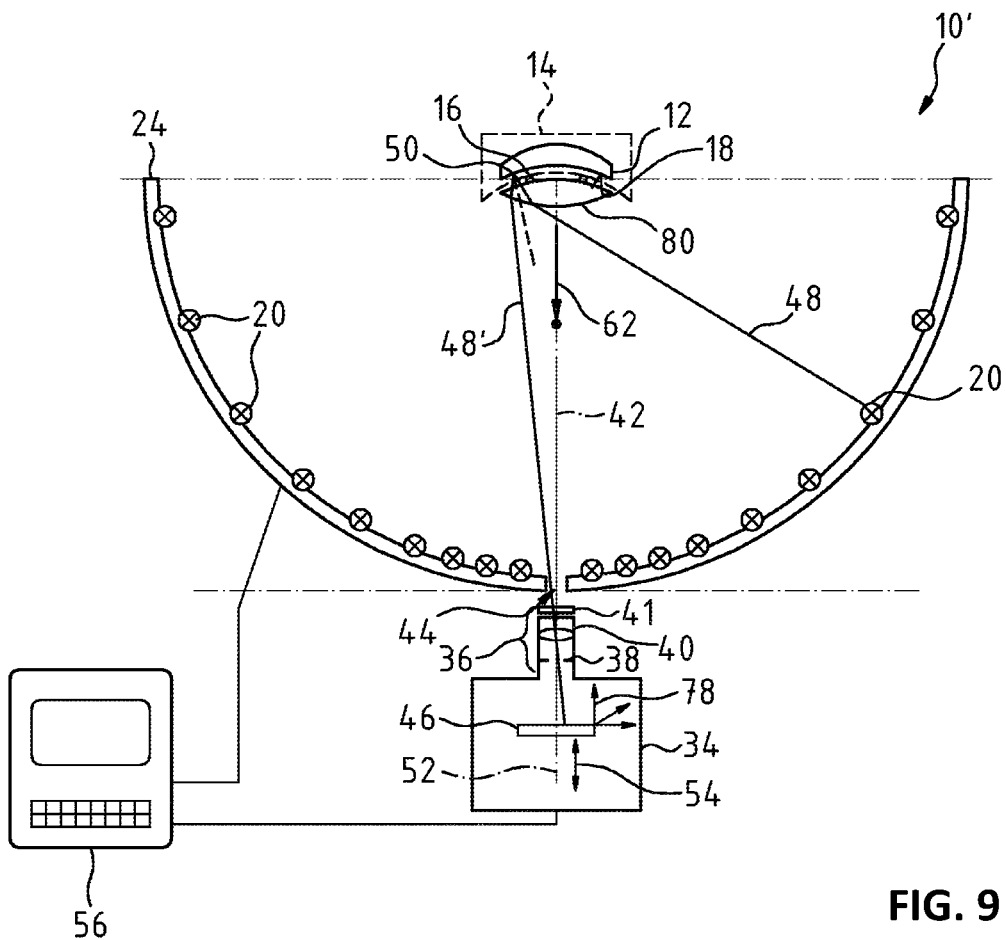
FIG. 9 shows a second apparatus for measuring the topography of an article in the form of a spectacle lens.

FIG. 9 shows a second apparatus 10' for measuring the topography of an article 12 in the form of a spectacle lens using point light sources 20. To the extent that the components and elements of the apparatus 10' correspond to components and elements of the apparatus 10 described above, these are identified by the same numbers in the reference signs. The apparatus 10' has a carrier structure 24 in the form of a hemisphere.

In the case of articles 12 embodied as spectacle lenses, the radius of which approximately corresponds to the radius of the hemisphere of the carrier structure 24, all reflected rays r will be incident at a point. Therefore, only very few point light sources 20 are imaged on the image sensor 46 of the camera 34 in this case. This has as a consequence that, using the apparatus 10 shown in FIG. 1 for measuring the topography of an article 12 in the form of a spectacle lens, such spectacle lenses cannot be measured, or at best can only be measured inaccurately, as a matter of principle.

The apparatus 10' shown in FIG. 9 for measuring the topography of an article 12 in the form of a spectacle lens, by contrast, also facilitates the measurement of spectacle lenses that have a radius approximately corresponding to the radius of the hemisphere of the carrier structure 24. To the extent that the components and elements of the apparatus 10' correspond to components and elements of the apparatus 10 in FIG. 1, these are identified by the same numbers in the reference signs.

The apparatus 10' contains a field lens element 80 arranged close to the recording region 14, the field lens element steering the light of the point light sources 20 that was reflected at the optically effective surface 18 of the article 12 in the direction of the camera 34.

To be able to accurately calculate the topography of the optically effective surface 18 of an article 12 with the computer program in the computer unit 56, it is necessary, in relation to the apparatus 10', to know in addition to the apparatus quantities, described above in relation to the apparatus 10 from FIG. 1, in the form of machine parameters, i.e., the apparatus constants of size of the light-sensitive area of the image sensor 46 and the spacing of the light-sensitive sensor pixels;

scale of the optical imaging of the camera 34;

spatial absolute and/or relative position of the image sensor 46 of the camera 34 in relation to the optical axis 42 of the optical imaging system 36 of the camera 34;

distortion of the optical imaging system 36 of the camera 34;

lateral displacement of the camera 34;

position, i.e., the coordinates, of each point light source 20 in a coordinate system 78 that is fixed in relation to the apparatus and referenced to the image sensor 46 of the camera 34; and coordinates of the center and radius of a spherical abutment in a coordinate system 78 that is fixed in relation to the apparatus and referenced to the image sensor 46 of the camera 34;

the accurate absolute position, relative position and form, i.e., in particular, the radius and the thickness of the field lens element 80, as a further apparatus quantity.

The field lens element 80 refracts the light emitted by the point light sources 20 before and after the reflection at the optically effective surface 18 of the article 12 in the form of a spectacle lens. What this achieves is that the angle of incidence in relation to the surface normal of the light emitted by the point light sources 20 on the optically effective surface 18 of the article 12 to be measured becomes steeper in general. What this can achieve is that the topography of optically effective concave surfaces of an article 12 to be measured can also be determined with high accuracy.

Figure 10:
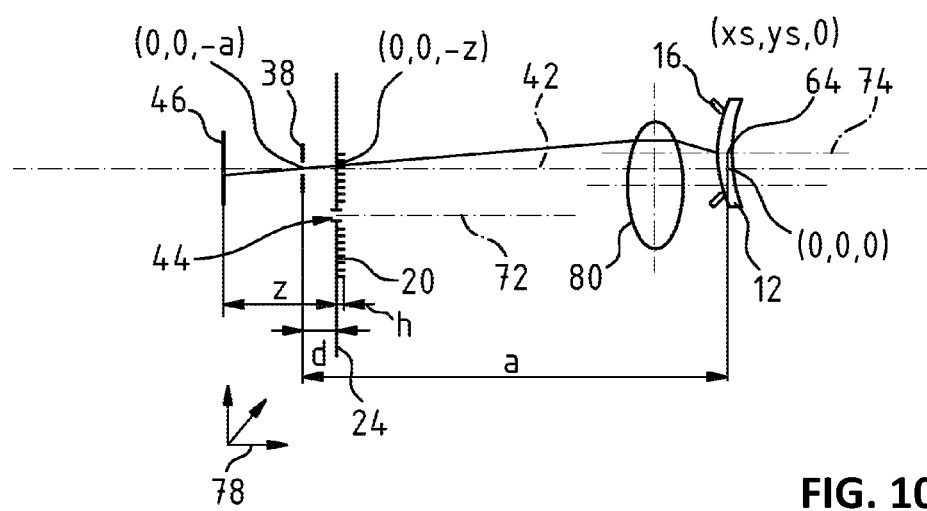
FIG. 10 shows the influence of manufacturing tolerances on apparatus constants of the apparatus.

FIG. 10 shows the influence of manufacturing tolerances on different apparatus constants of the apparatus 10'. On a microscopic scale, the optical axis 42 of the optical imaging system 36 of the camera 34 is arranged offset to the center 70 of the image sensor 46 in this case. In general, the axis of symmetry 72 of the carrier structure 24 differs from the optical axis 42 of the optical imaging system 36 of the camera 34 and from the axis of symmetry 74 of the three-point bearing 16. The point light sources 20 emit the light at a distance h from the surface of a printed circuit board 22. The recess 44 is arranged at the distance d from the stop 38 of the optical imaging system 36 of the camera 34. The image sensor 46 is positioned at the distance z from the stop 38 of the optical imaging system 36 of the camera 34. The center of symmetry 64 of the three-point bearing 16 has the distance a from the plane of the stop 38 of the optical imaging system 36 of the camera 34.

Exact knowledge of the apparatus constants is necessary so that a high measurement accuracy can be obtained with the apparatus for measuring the topography of an article 12 in the form of a spectacle lens.

Figure 11:
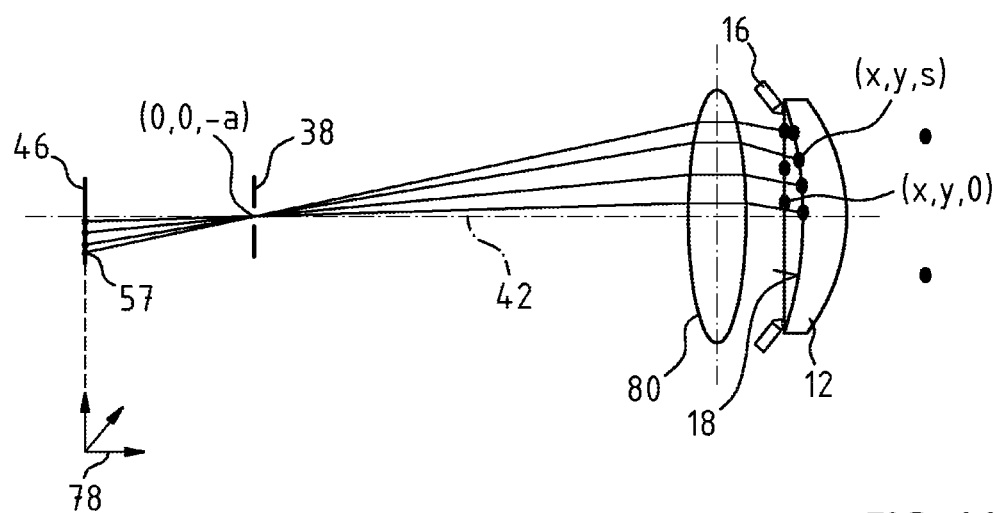
FIG. 11 and FIG. 12 show the spatial relationship of the reflection points, captured on an image sensor in the apparatus, for the light at the article to be measured and the absolute and/or relative position of point light sources.
Figure 12:
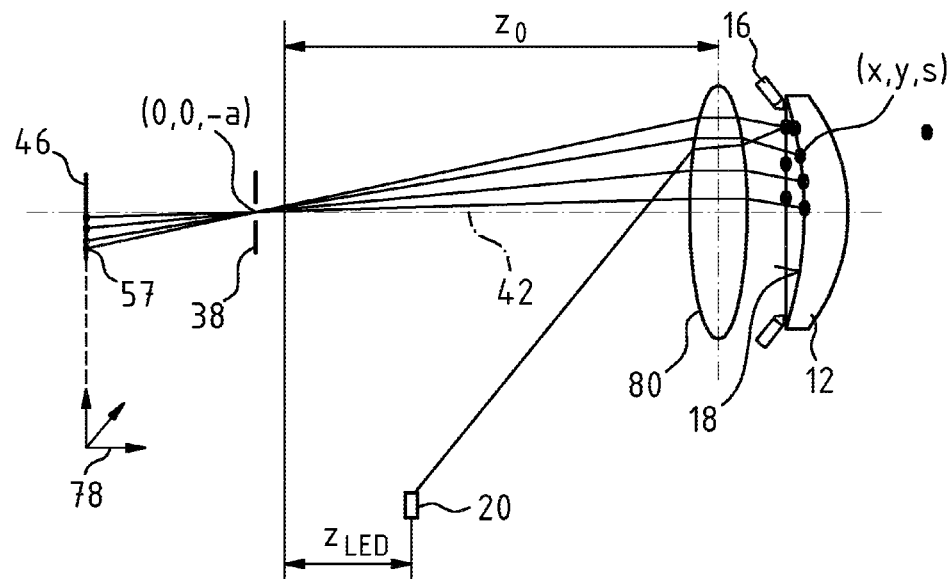

The exact calculation of the topography of the optically effective surface 18 of an article 12 in the form of a spectacle lens is explained below on the basis of FIG. 11 and FIG. 12.

The computer program in the computer unit 56 of the apparatus once again, in this case, makes use of an algorithm for the purposes of calculating the topography of the optical effective surface 18 of the article 12, the algorithm carrying out the following steps:

Step 1: determining the centroids 58 of the individual intensity distributions in a brightness distribution on the light-sensitive surface of the image sensor 46.

Step 2: assigning the centroids 58 of an intensity distribution on the light-sensitive surface of the image sensor 46 to a certain point light source 20.

Step 3: determining the location of the reflection on the optically effective surface 18 of the article 12 for each centroid 58.

Step 4: calculating the surface normal $\vec{n}$ on the optically effective surface 18 of the article 12 for each centroid 58.

Step 5: calculating the topography, e.g., as form and/or as sag s of the optically effective surface 18, by integrating the surface normal $\vec{n}$, i.e., by integrating the directional derivatives of the surface 18 determined by the surface normals $\vec{n}$.

Step 6: calculating the local curvatures of the optically effective surface 18 of the article 12 by differentiating the surface normal $\vec{n}$, i.e., by differentiating the entries of the vector of the surface normal $\vec{n}$.

Steps after Step 6: iteratively repeating steps 4 to 6 up to a convergence criterion, i.e., these steps are repeated until a normal difference of the topographies calculated in two successive steps is less than a predetermined tolerance.

To determine the location of the reflection on the optically effective surface 18 of the article 12 in the form of a spectacle lens, the computer program in the computer unit 56 of the apparatus 10' calculates an incident ray on the optically effective surface 18 of the article 12 in the form of a spectacle lens and then the point of intersection of this incident ray with the article 12 using Snell's law of refraction in a so-called standard ray tracing method. Thereupon, a sighting, with which the direction of the reflected beam that is incident on a corresponding point light source 20 is found, is determined with the computer program. Then, this sighting is established in an optimization routine, which minimizes the distance between the point light source 20 and the emergence beam from the field lens element 80. This optimization may yield a number of solutions, wherein the computer program selects that which is most similar to the neighboring points.

The corresponding sighting then supplies the direction of the reflected ray and, consequently, the angle of reflection at the test object, or the surface normal $\vec{n}$ at the point of incidence 50 of the corresponding incident ray i. The calculation of the optically effective surface 18 of the article 12 in the form of a spectacle lens is then implemented in the present case using the same method as without the field lens element 80. Therefore, the field lens element 80 is only of importance for calculating the surface normal $\vec{n}$.

It should be noted that the apparatuses described above are suitable, in principle, for measuring the topography of the surface of any measurement object whose surface has a reflectance R>50% for the light of the point light sources. In particular, corresponding measurement objects can be: optical elements in the form of lenses, optical units, spheres and aspheres, spectacle lenses, progressive lenses, metallic components with a shiny, in particular polished, surface, lacquered components and plastics components. Moreover, the apparatus described above can be used, in principle, to measure the topography of a human or animal eye.

To sum up, the following preferred features of the disclosure should be noted in particular: The disclosure relates to a method and an apparatus 10 for measuring the topography and/or the gradients and/or the curvature of an optically effective surface 18 of an article 12. The apparatus 10 facilitates arranging the article 12 in a recording region 14 with an abutment 17 that is able to be placed on the article 12. Here, in the recording region 14, it is possible to establish the absolute and/or relative position of at least one point on the surface 18 of the article in a coordinate system 78 that is fixed in relation to an apparatus. In the apparatus 10, there are a multiplicity of point light sources 20 that provide light, the light being reflected at the surface 18 of an article to be measured that is arranged in the recording region 14. The apparatus 10 comprises at least one camera 34 with a lens assembly 40 and with an image sensor 46 for capturing a brightness distribution, which is caused on an image sensor 46 by the light of the point light sources 20 that is reflected at the surface 18 to be measured.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 10, 10' Apparatus
12 Article
14 Recording region
16 Three-point bearing
17 Abutment
18 Optically effective surface
19 Carrier structure
20 Point light source, light spot
22, 22', 22" Printed circuit boards
24 Carrier structure
26 Hypersurface
28 Half-space
30 Edge
32 Optically effective surface
34 Camera
36 Imaging system
38 Stop
40 Lens assembly
41 UV band-elimination filter
42 Optical axis
44 Recess
46 Image sensor
48, 48' Light beam
50 Point
52 Adjustment axis
54 Double-headed arrow
56 Computer unit
57 Luminous spot
58 Centroids
60 Solid angle element
62 Spherical coordinate system
64 Center of symmetry
66 Node
68 North Pole
69 Hemisphere
70 Center
72 Axis of symmetry
74 Axis of symmetry
75 Grid network
76 Test object
78 Coordinate system
79 Brightness distribution
80 Lens element, field lens element
81 Image

The invention claimed is:

1. A method for measuring at least one of a topography, a gradient, or a curvature of an optically effective surface of an article, the method comprising:
reflecting light emitted by one or more light spots at the optically effective surface of the article to be measured;
capturing a brightness distribution of the reflected one or more luminous spots;
assigning the brightness distribution to the light spots causing the brightness distribution;
predetermining a first topography;
iteratively performing:
determining reflection locations on the article for the light emitted by the light spots;
calculating surface normals $\vec{n}$ at the reflection locations for the light emitted from the light points, determining directional derivatives at the surface normal $\vec{n}$ and interpolating the directional derivatives onto a regular polar grid; and calculating a further topography of the article by integrating the directional derivatives, determined by the surface normals $\vec{n}$, on the regular polar grid by way of solving the linear system of equations (I) reproduced below:

$$\begin{pmatrix} A^T A & C^T \\ C & 1 \end{pmatrix} z = \begin{pmatrix} \partial_r^2 z + \partial_\varphi^2 z \\ z(r=0) \\ z(\text{bearing}) \end{pmatrix}, \quad (I)$$

wherein A is a Jacobian matrix describing the numerical, polar derivatives on the polar grid and C a constraint matrix C describing the height of the article, measured at bearing points, and the polar condition $z(0,\varphi)=z(0)$;
up to a convergence criterion; and establishing at least one of an absolute position or a relative position of at least one point on the surface of the article to be measured in a coordinate system that is fixed relative to an apparatus.

2. The method as claimed in claim 1, further comprising:
determining reflection locations for the light emitted by the light points on the article from intersections of light rays calculated from centroids of the luminous spots of the brightness distribution with the further topography.

3. An apparatus for measuring at least one of a topography, a gradient, or a curvature of an optically effective surface of an article, the apparatus comprising:
a holding device configured to arrange the article on an abutment resting against the article in a recording region;
a plurality of point light sources configured to illuminate the optically effective surface of the article and a recording device configured to capture a brightness distribution composed of luminous spots, the brightness distribution being caused by the light of the plurality of point light sources, reflected at the surface of the article to be measured, to illuminate the optically effective surface of the article;
a device configured to establish at least one of an absolute position or a relative position of the luminous spots;
a device configured to establish the at least one of the absolute position or the relative position of at least one point on the optically effective surface of the article in a coordinate system that is fixed relative to an apparatus, the apparatus being configured to iteratively:
assign the brightness distribution to the point light sources causing the brightness distribution and predetermining a first topography;
determine reflection locations on the article for the light emitted by the point light sources;
calculate surface normals $\vec{n}$ at the reflection locations for the light emitted from the point light sources, determine directional derivatives at the surface normals $\vec{n}$, and interpolate the directional derivatives onto a regular polar grid; and
calculate a further topography of the article by integrating the interpolated directional derivatives of the optically effective surface, the directional derivatives being determined by the surface normals $\vec{n}$, on the regular polar grid by solving the linear system of equations (I) reproduced below:

$$\begin{pmatrix} A^T A & C^T \\ C & 1 \end{pmatrix} z = \begin{pmatrix} \partial_r^2 z + \partial_\varphi^2 z \\ z(r=0) \\ z(\text{bearing}) \end{pmatrix}, \quad (I)$$

wherein A is a Jacobian matrix describing the numerical, polar derivatives on the polar grid and C a constraint matrix C describing the height of the article, measured at bearing points, and the polar condition $z(0,\varphi)=z(0)$;
up to a convergence criterion.

4. The apparatus as claimed in claim 3, wherein the reflection locations for the light emitted by the point light sources on the article are determined from intersections of light rays calculated from the centroids of the luminous spots of the brightness distribution with the further topography.

5. The apparatus as claimed in claim 3, wherein the recording device comprises at least one camera having a lens assembly and an image sensor, on which the brightness distribution of light that is reflected at the optically effective surface is caused.

6. The apparatus as claimed in claim 5, wherein the lens assembly has an optical axis that lies flush with an adjustment axis.

7. The apparatus as claimed in claim 6,
wherein the abutment resting against the article in a recording region is a spherical abutment.

8. The apparatus as claimed in claim 7, further comprising:
a multiplicity of point light sources that provide light, the light being reflected at the optically effective surface of an article to be measured that is arranged in the recording region.

9. The apparatus as claimed in claim 5, further comprising:
a computer unit having a computer program and a non-transitory memory, in which the computer program is stored, wherein the computer program calculates the at least one of the topography, the gradient, or the curvature of an optically effective surface of the article with an algorithm from a brightness distribution captured by the image sensor, the brightness distribution being caused on an image sensor by light of the point light sources that is reflected at the optically effective surface to be measured.

10. The apparatus as claimed in claim 3, wherein the point light sources are arranged on a three-dimensional half-space.

11. The apparatus as claimed in claim 3, further comprising:
a lens element arranged between the recording region and a lens assembly, the refractive power of the lens element being positive or negative.

12. The apparatus as claimed in claim 11, wherein the lens element has an optical axis that lies flush with the optical axis of the lens assembly.

13. The apparatus as claimed in claim 3, further comprising:
a computer with a computer program stored on a non-transitory memory, the computer program determining the position of the point light sources with an optimization method when executed on the computer.

14. The method as claimed in claim 1, further comprising:
   determining the at least one of the absolute position or the relative position of the light spots with an optimization method.

15. A computer program stored on a non-transitory memory having program code implementing a method as claimed in claim 1 when the program is executed on a computer unit.

\* \* \* \* \*